(12) United States Patent
Remy et al.

(10) Patent No.: US 10,048,144 B2
(45) Date of Patent: Aug. 14, 2018

(54) METHOD AND SYSTEM FOR APPLYING A COMPRESSIVE PRELOAD

(71) Applicant: Pratt & Whitney Canada Corp., Longueuil (CA)

(72) Inventors: Patrice Remy, St-Hubert (CA); Pierre Gaudet, Montreal (CA)

(73) Assignee: PRATT & WHITNEY CANADA CORP., Longueuil, Quebec (CA)

( * ) Notice: Subject to any disclaimer, the term of this patent is extended or adjusted under 35 U.S.C. 154(b) by 1343 days.

(21) Appl. No.: 13/940,321

(22) Filed: Jul. 12, 2013

(65) Prior Publication Data

US 2015/0019144 A1 Jan. 15, 2015

(51) Int. Cl.

| G01L 1/00 | (2006.01) |
|---|---|
| G01L 3/00 | (2006.01) |
| G01L 5/00 | (2006.01) |
| G01L 5/13 | (2006.01) |
| B25B 23/14 | (2006.01) |
| G01M 15/00 | (2006.01) |
| G01M 15/14 | (2006.01) |

(52) U.S. Cl.
CPC .............. G01L 5/133 (2013.01); B25B 23/14 (2013.01); G01M 15/00 (2013.01); G01M 15/14 (2013.01)

(58) Field of Classification Search
None
See application file for complete search history.

(56) References Cited

U.S. PATENT DOCUMENTS

| 3,954,004 A * | 5/1976 | Orner ........................ G01L 5/24 73/761 |
| 4,911,004 A * | 3/1990 | Leon ...................... G01L 5/0061 73/168 |
| 4,965,994 A * | 10/1990 | Ciokajlo ............... F01D 25/162 60/805 |
| 5,267,397 A * | 12/1993 | Wilcox .................. B63H 21/16 29/889.1 |

(Continued)

OTHER PUBLICATIONS

*Electric Power Group v. Alstom* (See Attached).*
Ogaji et al; Parameter selection for diagnosing a gas-turbine's performance-deterioration; Applied Energy 73 (2002) 25-46.*

*Primary Examiner* — Mohamed Charioui
*Assistant Examiner* — Leonard S Liang
(74) *Attorney, Agent, or Firm* — Norton Rose Fulbright Canada LLP

(57) ABSTRACT

A method of validating a compressive axial preload on adjacent rotatable elements serially arranged around a shaft, created through application of a progressively increasing axial tension to a tensioning member configured to compress the elements when the axial tension is applied. The method includes monitoring a load in the tensioning member and/or in one or more of the elements, and an elongation of the tensioning member, during application of the axial tension, determining at least one validation parameter from the load and the elongation, comparing each validation parameter with a respective predetermined range therefor; and if at least one of the at least one validation parameter is out of the respective predetermined range, correcting the preload on the elements, and repeating the method. A method of applying the compressive preload and a system for validating the compressive preload are also described.

19 Claims, 9 Drawing Sheets

(56) References Cited

U.S. PATENT DOCUMENTS

| | | | |
|---|---|---|---|
| 5,463,812 A | 11/1995 | Aschenbruck et al. | |
| 5,537,814 A * | 7/1996 | Nastuk | F01D 5/066 60/796 |
| 5,594,665 A * | 1/1997 | Walter | F04D 27/001 415/26 |
| 5,748,500 A * | 5/1998 | Quentin | F02C 7/26 702/182 |
| 5,809,100 A | 9/1998 | Butler | |
| 6,474,935 B1 * | 11/2002 | Crotty | F01D 21/003 415/1 |
| 6,494,046 B1 * | 12/2002 | Hayess | F01D 21/00 60/39.091 |
| 6,568,254 B2 | 5/2003 | Pross | G01N 3/062 73/112.01 |
| 6,948,381 B1 * | 9/2005 | Discenzo | G01L 3/12 73/800 |
| 7,147,436 B2 | 12/2006 | Suciu et al. | |
| 7,966,889 B2 * | 6/2011 | Cairo | G01M 11/081 73/760 |
| 8,036,844 B2 * | 10/2011 | Ling | G05B 23/0221 324/76.77 |
| 8,276,466 B2 | 10/2012 | Kurtz et al. | |
| 8,438,858 B1 * | 5/2013 | Jones | F01D 11/003 60/796 |
| 8,596,137 B2 * | 12/2013 | Mathias | G01B 5/20 702/155 |
| 2008/0175703 A1 * | 7/2008 | Lugg | F02C 7/36 415/66 |
| 2008/0177516 A1 * | 7/2008 | Vasudevan | B64F 5/0045 703/2 |
| 2009/0180887 A1 * | 7/2009 | Mischo | F01D 5/20 416/223 R |
| 2011/0259110 A1 * | 10/2011 | Smith | G01B 3/18 73/760 |
| 2011/0288790 A1 * | 11/2011 | Dong | G06F 17/5009 702/34 |
| 2012/0107098 A1 | 5/2012 | Tirone, III et al. | |
| 2014/0278153 A1 * | 9/2014 | Barr | G01L 1/246 702/42 |

* cited by examiner

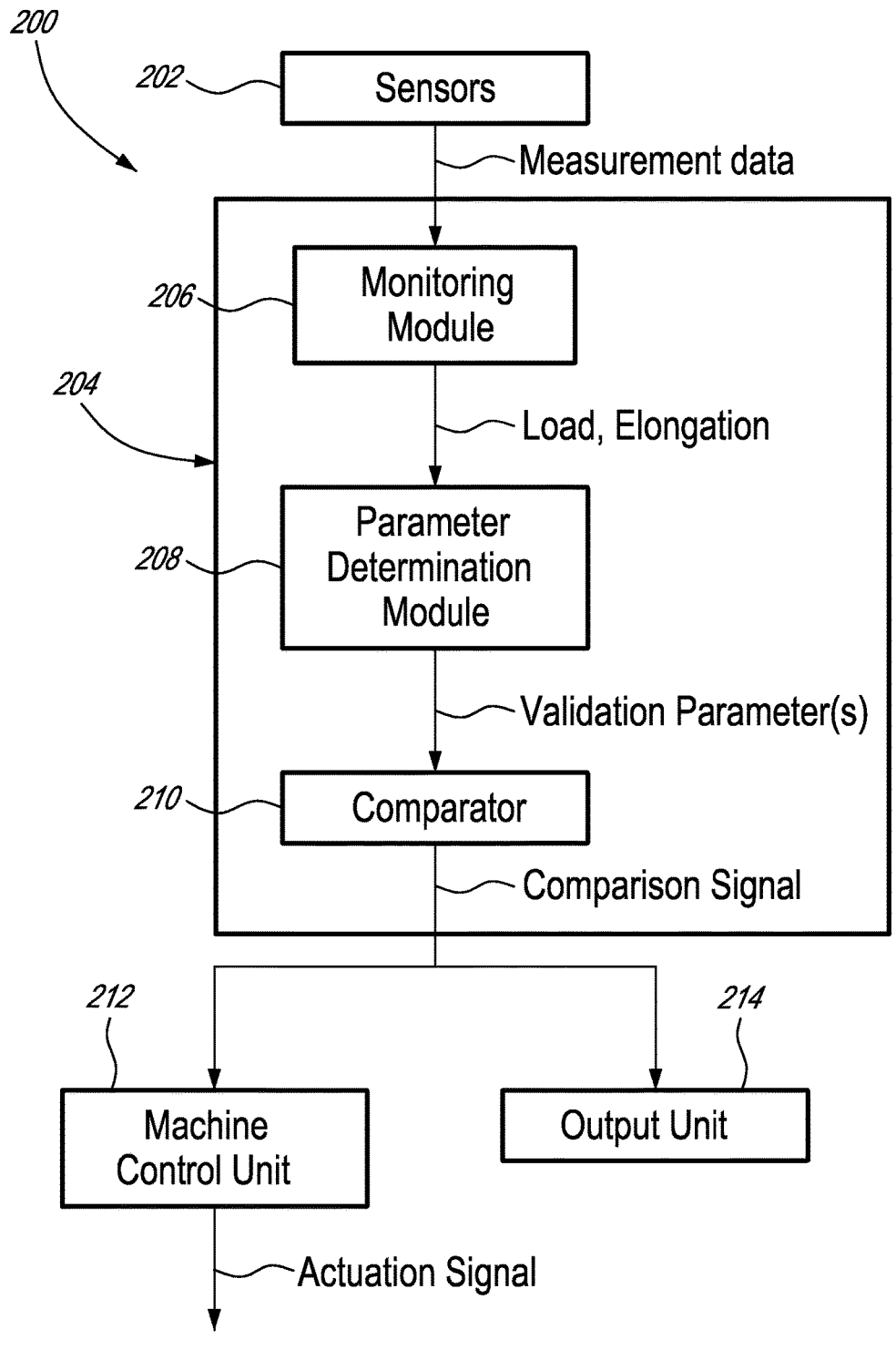

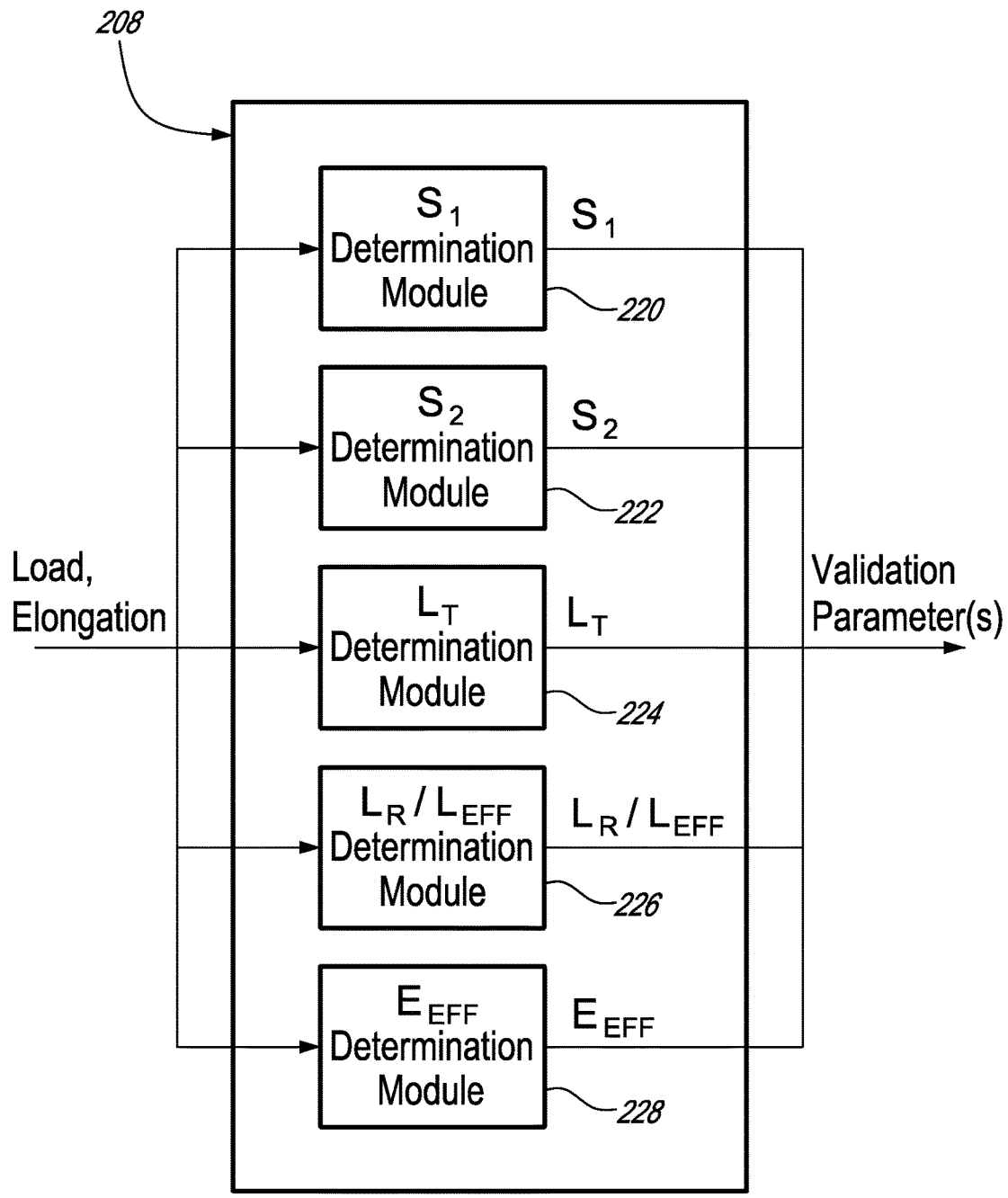

METHOD AND SYSTEM FOR APPLYING A COMPRESSIVE PRELOAD

TECHNICAL FIELD

The application relates generally to gas turbine engines, and more particularly to assemblies under a compressive preload in such engines.

BACKGROUND OF THE ART

In gas turbine engines, it is known to apply a compressive axial preload to rotors and other elements received around a same shaft. The preload may be applied for example through applying tension to tensioning rods, and the elongation of the tensioning rods is measured to determine if the load applied is sufficient. However, some defects may occur during application of the preload, for example one of the elements being locked in the shaft causing undesired gaps between the elements, deviations in squareness of the assembly, improper seating of the elements, etc., which may lead to the preload not effectively being applied despite the rods having undergone the required elongation.

SUMMARY

In one aspect, there is provided a method of validating a compressive axial preload on adjacent rotatable elements serially arranged around a shaft, the axial preload being created through application of a progressively increasing axial tension to a tensioning member configured to compress the elements when the axial tension is applied thereto, the tensioning member corresponding to the shaft around which the elements are arranged or to another elongated member, the method comprising: a) monitoring a load in the tensioning member and/or in one or more of the elements during application of the axial tension; b) monitoring an elongation of the tensioning member during application of the axial tension; c) determining at least one validation parameter from the load and the elongation; d) comparing each validation parameter with a respective predetermined range; and e) if at least one of the at least one validation parameter is out of the respective predetermined range, correcting the preload on the elements, and repeating the method from step a).

In another aspect, there is provided a method of applying a compressive axial preload on adjacent rotatable elements serially arranged around a shaft, the method comprising: a) inducing the compressive axial preload by applying axial tension to a tensioning member connected to an abutment surface pressing against the elements when the tensioning member is under the axial tension, the tensioning member corresponding to the shaft around which the elements are arranged or to another elongated member, the axial tension being applied in a progressively increasing manner; b) monitoring a load in the tensioning member and/or in one or more of the elements and an elongation of the tensioning member as the axial tension is applied; c) determining at least one validation parameter from the load and the elongation; d) comparing each validation parameter with a respective predetermined range therefor; e) if each validation parameter is within the respective predetermined range, applying the axial tension up to a predetermined value, engaging a retaining member with the tensioning member to block retraction of the tensioning member and maintain the compressive axial preload on the elements, and releasing the axial tension; and f) if at least one of the at least one validation parameter is out of the respective predetermined range, releasing the axial tension on the tensioning member before the retaining member is engaged, at least partially disassembling elements from around the shaft, re-assembling the elements around the shaft, and repeating the method from step a).

In a further aspect, there is provided a system for validating a compressive axial preload on adjacent rotatable elements serially arranged around a shaft, the axial preload being created through application of a progressively increasing axial tension to a tensioning member configured to compress the elements when the axial tension is applied thereto, the system comprising: a processing unit configured to: receive measurement data from one or more sensors indicative of a physical quantity related to a load in the tensioning member and/or in one or more of the elements during application of the axial tension and indicative of a physical quantity related to an elongation of the tensioning member during application of the axial tension, determine the load and the elongation from the measurement data, determine at least one validation parameter from the load and the elongation, compare each validation parameter with a respective predetermined range therefor, and send a comparison signal validating the compressive axial preload when each validation parameter is within the respective predetermined range and rejecting the compressive axial preload when at least one of the at least one validation parameter is out of the respective range; and an output unit configured to receive the validation signal and to output data based on the validation signal.

DESCRIPTION OF THE DRAWINGS

Reference is now made to the accompanying figures in which:

FIG. 8 is a block diagram of a system for validating a compressive preload in accordance with a particular embodiment; and FIG. 9 is a block diagram of a parameter determination module of the system of FIG. 8, in accordance with a particular embodiment.

DETAILED DESCRIPTION

Figure 1:
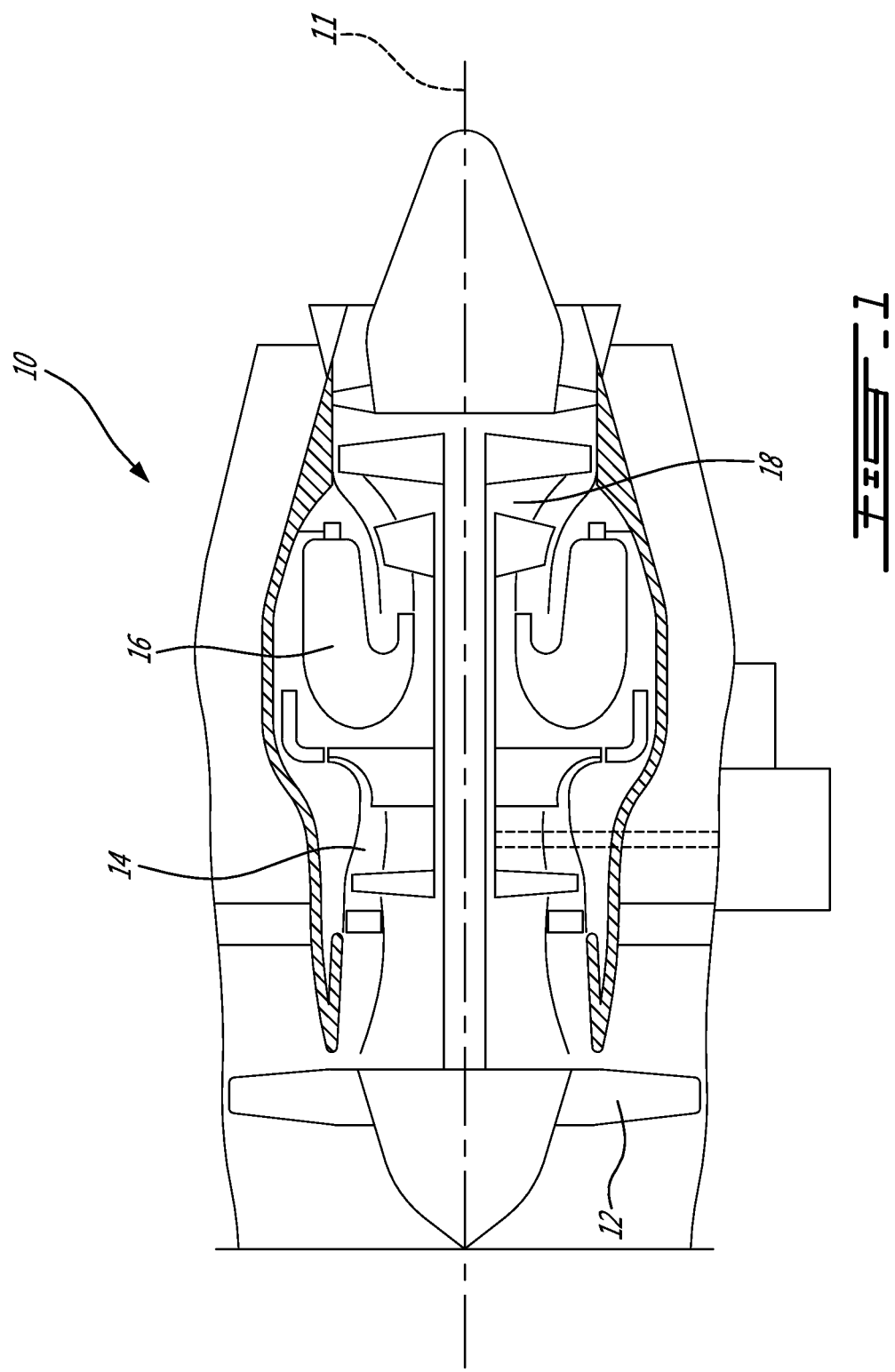
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The engine 10 includes adjacent rotatable elements which are serially arranged around a shaft and upon which an axial compressive preload is applied. In a particular embodiment, such preload may allow to optimize the loads in operation, reduce vibrations, reduce the load variations due to thermal expansion and/or reduce the size and as such the weight of the shaft supporting the rotational elements.

Figure 2:
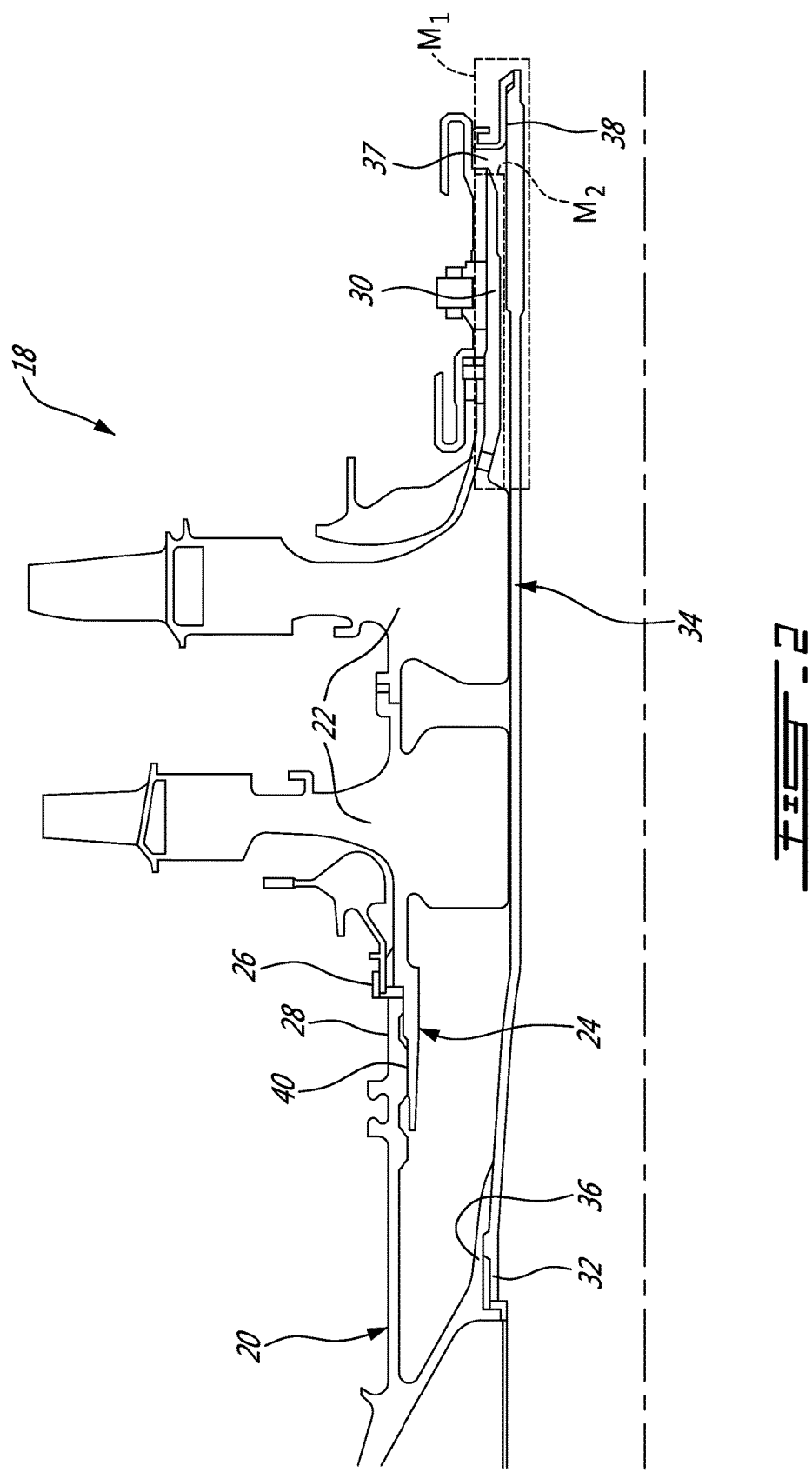
FIG. 2 is a schematic cross-sectional view of part of a turbine section of a gas turbine engine such as shown in FIG. 1, in accordance with a particular embodiment.

An example of such rotatable elements is shown in FIG. 2, where a portion of the turbine section 18 is shown. In this particular embodiment, the rotatable elements include a plurality of bladed turbine disks 22 juxtaposed with respect to one another between forward and aft ends of a turbine hub 24. The turbine disks 22 are arranged around a shaft 34. In a particular embodiment the disks 22 are located-around the shaft 34 with an interference fit.

The turbine section 18 is connected to an adjacent element of the engine, which in a particular embodiment is a hub 20 of the compressor section 14. A forward extension of the forwardmost turbine disk 22 defines the forward end 26 of the turbine hub 24, and abuts an abutment surface defined by a first aft member 28 of the compressor hub 20. The turbine hub's forward end 26 and the first aft member 28 are interconnected through a spline connection 40. An aft extension of the aftmost bladed turbine disk 22 defines the aft end 30 of the turbine hub 24.

A forward end 32 of the shaft 34 is threaded and engages a second aft member 36 of the compressor hub 20, which is also threaded. An aft end 38 of the shaft 34 is threaded and receives a threaded retaining member 37, such as a threaded nut, thereon. The retaining member 37 abuts the aft end 30 of the turbine hub 24. As such, when the forward end 32 of the shaft 34 is threadingly engaged with the second aft member 36 of the compressor hub 20 and when the retaining member 37 is threadingly engaged with the aft end 38 of the shaft 34 and presses against the aft end 30 of the turbine hub 24, the bladed turbine disks 22 are compressively retained and preloaded.

It is understood that the assembly of FIG. 2 is shown only as an example of a structure to which the method described below may be applied. Alternate structures to which the method may be applied include, but are not limited to, compressor and/or turbine rotors, any rotating assembly featuring a stack of parts such as a multi stage pumps or an electrical generator, and other type of mechanical assemblies such as bolted joints, screw joints or stud joints; examples of compressed elements may include, but are not limited to, rotor discs, bearings, carbon seals, flanges and/or and other fastened parts.

Figure 3:
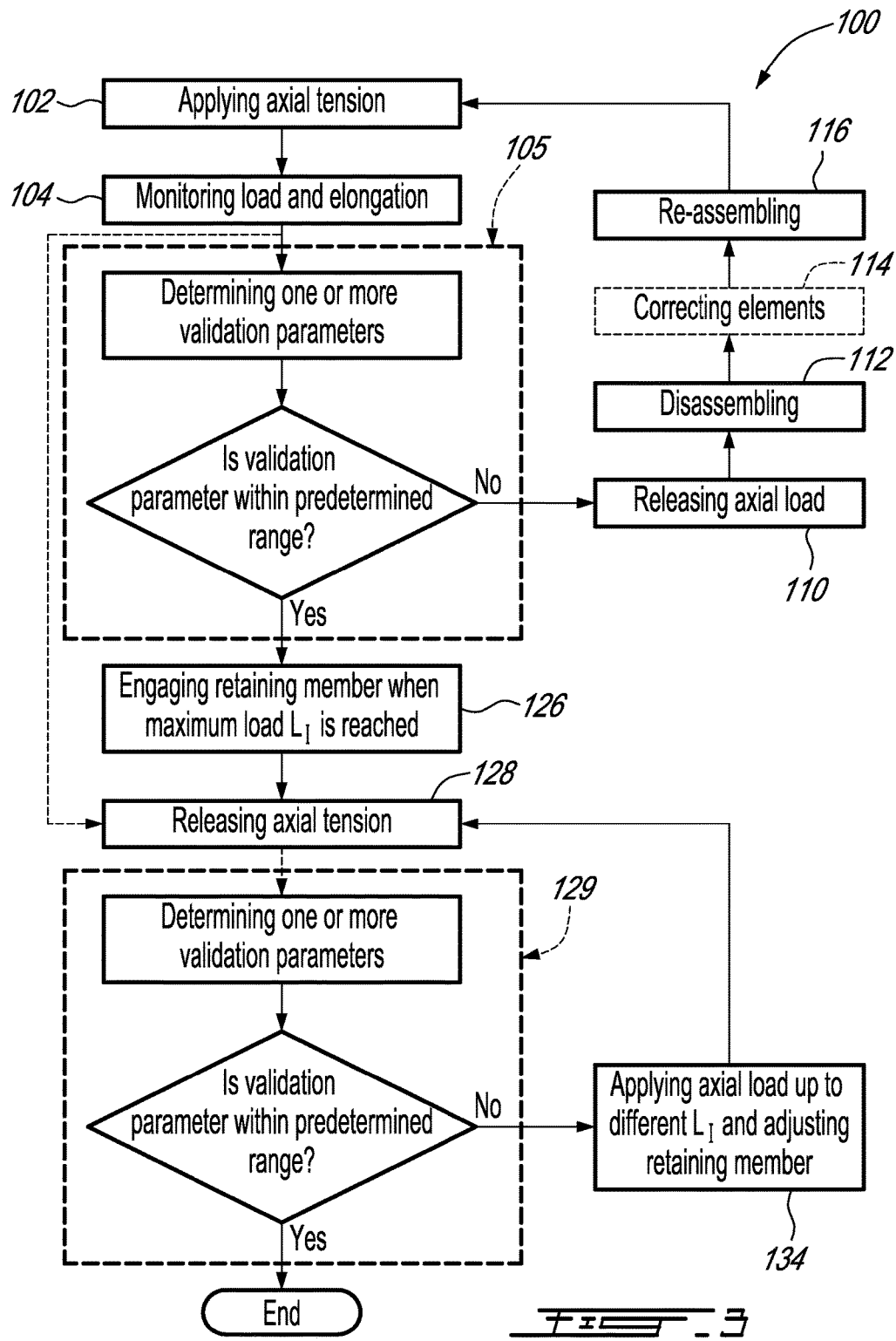
FIG. 3 is a flow chart of a method of applying and validating a compressive preload on an assembly such as the turbine section shown FIG. 2, in accordance with a particular embodiment.

Referring to FIG. 3, an embodiment of a method 100 of applying and validating a compressive axial preload on a series of rotatable elements such as for example the rotor disks 22, serially arranged around a shaft, such as for example the shaft 34, is schematically shown.

In step 102, the compressive axial preload on the elements is induced by applying axial tension to a tensioning member configured to compress the elements when the axial tension is applied thereto. In the particular embodiment shown in FIG. 2, the tensioning member is the shaft 34 around which the elements, in this case the disks 22, are arranged; the shaft 34 is connected to the abutment surface of the first aft member 28 of the compressor hub 20 through its threaded engagement with the second aft member 36, and transfers the load to the elements through the abutment with the aft end 30 of the turbine hub 24. In an alternate embodiment, the tensioning member is another element configured to compress the elements, such as for example one or more tie bolts. The axial tension is applied in a progressively increasing manner.

Figure 6:
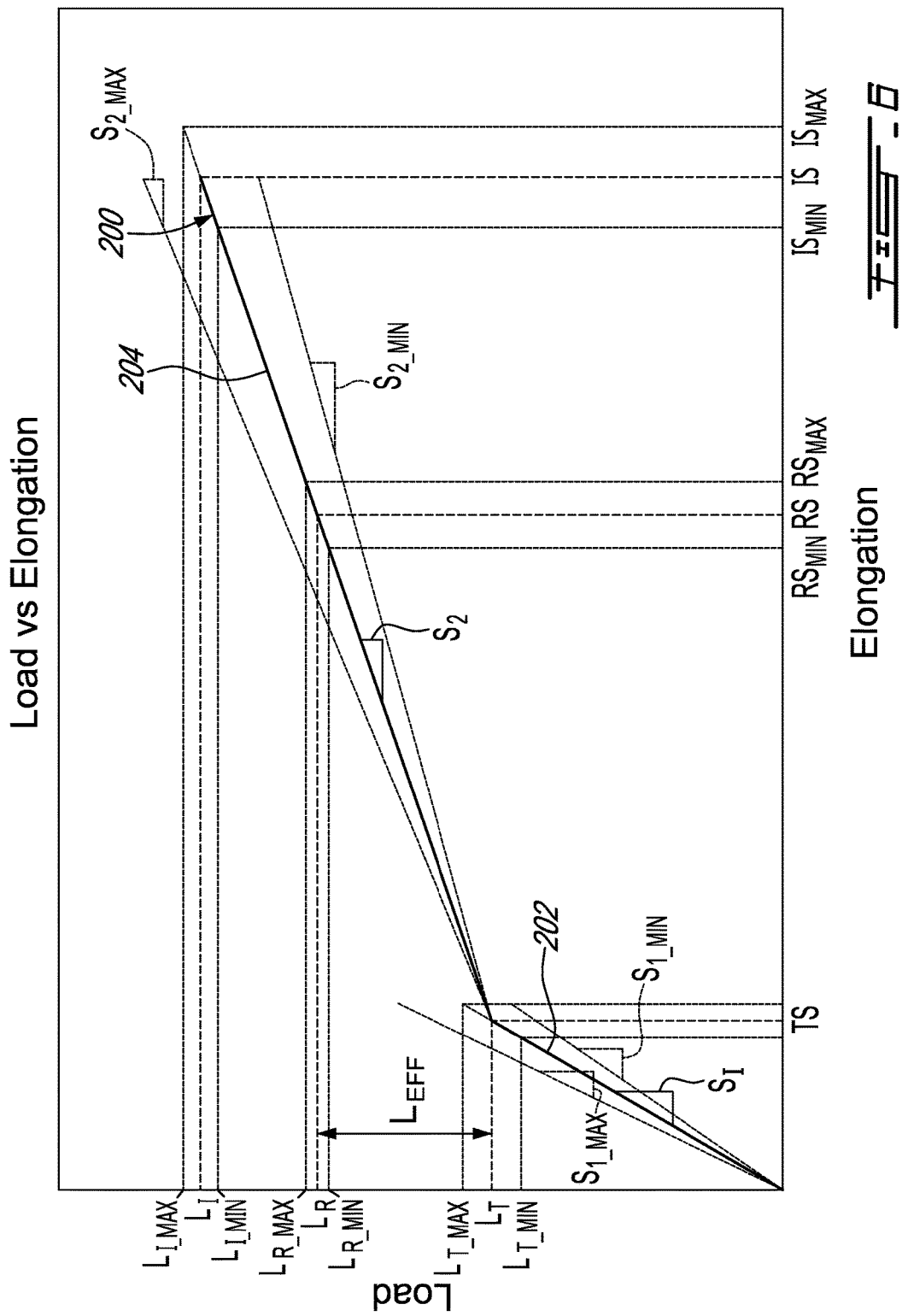
FIG. 6 is a graph of a load as a function of an elongation of a tensioning member during application of a compressive preload, in accordance with a particular embodiment.

In step 104, the load in the tensioning member and/or in one or more of the elements is monitored, as well as the elongation of the tensioning member, as the axial tension is applied. In a particular embodiment, a graph of the load in relation to the elongation is prepared; an example of such a graph is shown in FIG. 6, where the load as a function of the elongation is illustrated by linear function 200.

In a particular embodiment, the load is monitored through direct measurement thereof, for example through measurement of the axial tension applied to the tensioning member using a load cell. In another embodiment, the load is monitored through measurement of another physical quantity related to the load. For example, the strain in the tensioning member and/or in one or more of the elements may be measured using one or more strain gage(s); a pressure related to the load may be measured, such as an hydraulic pressure in an apparatus used to apply the axial tension to the tensioning member. Any appropriate measurement of any physical quantity related to or representative of the load may be used, using any appropriate measurement system, and the load is determined from that measurement.

In a particular embodiment, the elongation is monitored using a linear variable differential transformer (LVDT). Alternately, any other appropriate measurement system may be used, and any physical quantity related to or representative of the elongation may be measured.

In step 105, a first test is performed. The first test includes determining one or more validation parameter(s) from the load and the elongation, and determining if each validation parameter is within a respective predetermined range around a respective nominal value. The parameter(s) are selected such as to be indicative of an aspect of the quality of the preload in the assembly.

If one or more of the validation parameter(s) is out of its respective range, the compression preload is determined to be unacceptable and to require correction. As such, the axial load on the tensioning member is released as shown in step 110; the elements are disassembled from the shaft in step 112, and inspected; if required, the elements are corrected to remove any found defects in step 114; and the elements are re-assembled around the shaft in step 116. The axial load can then be re-applied and the method is repeated from step 102 described above.

In step 126, if each validation parameter is within its respective range, the axial tension is applied until a target maximum load LI is reached, and a retaining member (such as the retaining member 37 in the example of FIG. 2) is engaged with the tensioning member to block retraction of the tensioning member and maintain the compressive axial preload on the elements. The axial tension on the tensioning member is then released as shown in step 128.

The first test 105 thus allows for validation of the compressive preload as it is being applied, thus in a particular embodiment simplifying the process of applying necessary corrections since such corrections may be applied before the end of the application of the compressive preload.

In the particular embodiment shown in FIG. 6, the load increases linearly as a function of the elongation following a first constant rate of increase up to a point of transition and following a second constant rate of increase after the point of transition. Examples of parameters which may be determined in the first test 105 are shown and include a first constant rate of increase $S_1$ of the load with respect to the elongation, a transition load $L_T$, and a second constant rate of increase $S_2$ of the load with respect to the elongation.

Figure 4:
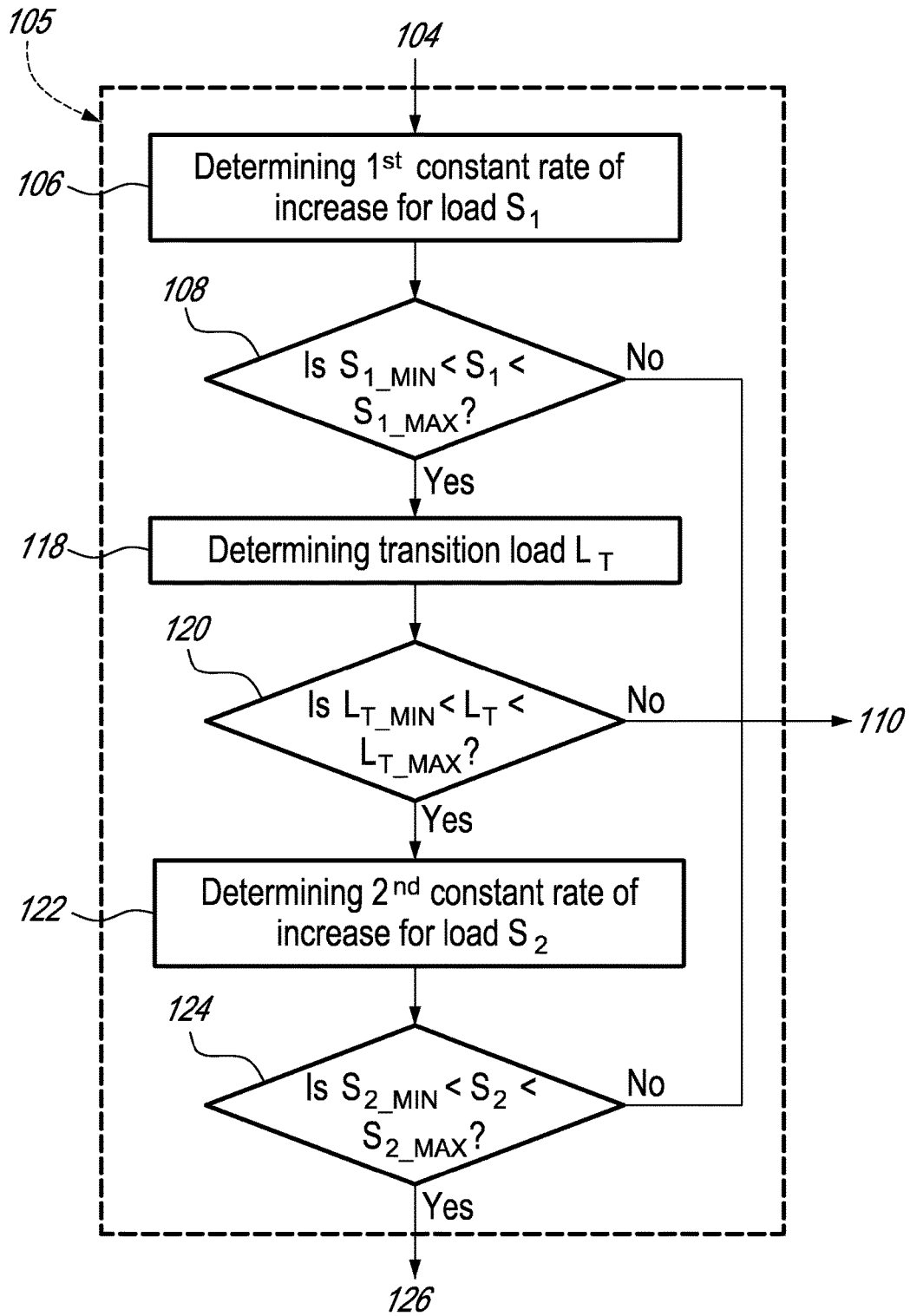
FIG. 4 is a flow chart of a first test of the method of FIG. 3, in accordance with a particular embodiment.

Referring to FIG. 4, an example for the first test 105 is shown. Although in the embodiment shown three parameters are determined and evaluated, it is understood that in another embodiment, only one of the parameters may be determined and evaluated; and in another embodiment, any combination of two of the parameters may be determined and evaluated. It is also understood that additional or alternate parameters may be determined and evaluated from the load and the elongation if such parameters are indicative of an aspect of the quality of the preload in the assembly which may be corrected if required.

First test 105 as shown includes step 106, in which the first constant rate of increase $S_1$ of the load with respect to the elongation is determined. This first rate may be defined by the slope of the first linear segment 202 of the relation between the load and elongation in FIG. 6, before the point of transition.

In step 108, the first rate of increase $S_1$ is compared to a predetermined acceptable range defined between a minimum value $S_{1\_MIN}$ and a maximum value $S_{1\_MAX}$, which represent an acceptable variation around a nominal value.

In a particular embodiment, the elements are assembled around the shaft with an interference fit, and the first linear segment 202 of the relation between the load and elongation represents a seating phase, where the elements and shaft (and tensioning member, if such is different from the shaft) move together as a whole because of the interference fit. The nominal value for the first rate of increase $S_1$ is representative of the stiffness of the assembly of the elements and of the tensioning member, and calculated for example based on the Young's modulus of the material(s) of the elements and of the tensioning member and on the surface section under compression for each.

In a particular embodiment, the nominal value for the first rate of increase $S_1$ is calculated as:

$$S_1 = K_{M_1} = \frac{E_{eq} \times A_{eq}}{l_{eq}}$$

where $K_{M1}$, $E_{eq}$, $A_{eq}$ and $I_{eq}$ respectively correspond to the stiffness, the Young modulus, the cross-sectional area and the length of an equivalent stiffness member corresponding to the combined elements and portion of the tensioning member which form the interference fit adjacent the end of the tensioning member on which the tension is applied. For example, in the embodiment of FIG. 2, the equivalent stiffness member may be defined as the combination of the elements identified by $M_1$: bearing race, seal runners, aft end 30 of the turbine hub 24, and portion of the shaft 34 engaged therewith.

In a particular embodiment, the minimum value $S_{1\_MIN}$ and maximum value $S_{1\_MAX}$ are defined as ±5% of the nominal value $S_1$. Other variations may alternately be used.

In a particular embodiment, the first rate of increase $S_1$ is used to detect losses in bending forces, improper seating of the elements on the shaft, and/or lack of squareness of the elements, as any of these defects may affect the stiffness of the assembly of the elements and shaft, and as such cause the first rate of increase $S_1$ to be outside the acceptable range defined by the minimum and maximum values $S_{1\_MIN}$, $S_{1\_MAX}$. As such, if the first rate of increase $S_1$ is outside its acceptable range, steps 110 and following are performed, as described above. Disassembling and re-assembling the elements on the shaft, and optionally correcting one or more of the elements, may allow to correct the losses in bending forces, improper seating and/or lack of squareness such that the first rate of increase $S_1$ is brought within its acceptable range.

In a particular embodiment, the evaluation of the first rate of increase $S_1$ during the first test 105, prior to engagement of the retaining member on the tensioning member, allows for an earlier detection of losses in bending forces, improper seating and/or lack of squareness, as such defects are typically detected during analysis of the dynamic behavior of the completed and preloaded assembly in rotation.

In a particular embodiment, the evaluation of the first rate of increase $S_1$ during the first test 105 may also allow to select the best orientation between the elements to reduce the energy lost to bending.

Still referring to FIG. 4, first test 105 as shown also includes step 118, where a transition load $L_T$ is determined. The transition load $L_T$ corresponds to the load at the transition point, where the rate of increase of the load with respect to the elongation changes from the first rate of increase $S_1$ to the different second rate of increase $S_2$. As the shaft is put under tension, its diameter reduces due to the Poisson effect; in a particular embodiment, the transition load indicates the point where the diameter has sufficiently reduced to eliminate the interference fit between the elements and the shaft.

In step 120, the transition load $L_T$ is compared to a predetermined acceptable range defined between a minimum value $L_{T\_MIN}$ and a maximum value $L_{T\_MAX}$, which represent an acceptable variation around a nominal value. In a particular embodiment, the nominal value for the transition load $L_T$ is determined based on the value of the nominal interference fit between the elements and the shaft.

In a particular embodiment, the nominal transition stretch TS (see FIG. 6) corresponding to the elongation at the transition point is calculated as:

$$TS = \frac{R_{fit}}{\vartheta_{shaft}}$$

where $R_{fit}$ is the nominal radial interference fit between the elements and the shaft and $v_{shaft}$ is the Poisson ratio of the shaft. The nominal value for the transition load $L_T$ is then calculated as:

$$L_T = TS \times K_{M1}$$

where $K_{M1}$ is the stiffness of the equivalent member as described above.

In a particular embodiment, the % range between the minimum and maximum values for the transition load $L_T$ is broader than that of the first rate of increase $S_1$. In a particular embodiment, the minimum value $L_{T\_MIN}$ and the maximum value $L_{T\_MAX}$ are defined as ±10% of the nominal value $L_T$. Other variations may alternately be used.

Accordingly, in a particular embodiment, the transition load $L_T$ is used to detect an improper intensity in the interference fit between the shaft and the elements, as an intensity of the interference fit out of acceptable values causes the transition load $L_T$ to be outside the acceptable range defined by the minimum and maximum values $L_{T\_MIN}$, $L_{T\_MAX}$. An improper intensity of the interference fit may be caused, for example, by the elements having dimensions out of acceptable values or having been damaged during the assembly. As such, if the transition load $L_T$ is outside its acceptable range, steps 110 and following are performed, as described above. Disassembling and re-assembling the elements on the shaft, and optionally correcting one or more of the elements, may allow to correct the interference fit such that the transition load $L_T$ is brought within its acceptable range.

In a particular embodiment, the evaluation of transition load $L_T$ during the first test 105 allows for an evaluation of the intensity of the interference fit between the elements and the shaft, which is a characteristic of the assembly which may otherwise be difficult to evaluate.

Still referring to FIG. 4, first test 105 as shown also includes step 122, where the second constant rate of increase $S_2$ of the load with respect to the elongation is determined. This second rate may be defined by the slope of the second linear segment 204 of the relation between the load and elongation in FIG. 6, after the point of transition.

In step 124, the second rate of increase $S_2$ is compared to a predetermined acceptable range defined between a minimum value $S_{2\_MIN}$ and a maximum value $S_{2\_MAX}$, which represent an acceptable variation around a nominal value.

In the particular embodiment where the elements and the shaft are assembled with an interference fit, the second linear segment 204 of the relation between the load and elongation represents a loading phase, where the elements and shaft move independently because of the interference fit no longer being present due to the reduction of cross-section of the shaft under the axial tension. The nominal value for the second rate of increase $S_2$ is representative of the stiffness of the shaft/tensioning member without the elements, and calculated for example based on the Young's modulus of the material(s) of the shaft/tensioning member and on the surface section under compression.

In a particular embodiment where the tensioning member is the shaft 34 around which the elements are received, the nominal value for the second rate of increase $S_2$ is calculated as:

$$S_2 = K_{shaft} = \frac{E_{shaft} \times A_{shaft}}{l_{shaft}}$$

where $K_{shaft}$, $E_{shaft}$, $A_{shaft}$ and $l_{shaft}$ respectively correspond to the stiffness, the Young modulus, the cross-sectional area and the length of the shaft 34.

In a particular embodiment, the % range between the minimum and maximum values for the second rate of increase $S_2$ is narrower than that of the first rate of increase $S_1$. In a particular embodiment, the minimum value $S_{2\_MIN}$ and maximum value $S_{2\_MAX}$ are defined as ±2.5% of the nominal value $S_2$. Other variations may alternately be used.

Accordingly, in a particular embodiment, the second rate of increase $S_2$ is used to detect a friction lock between an element and the shaft, as this affects the stiffness measured, which would be representative of that of the shaft and element stuck thereto due to the friction lock instead of that of the shaft free of the elements, thus causing second rate of increase $S_2$ to be outside the acceptable range defined between the minimum and maximum values $S_{2\_MIN}$, $S_{2\_MAX}$. In a particular embodiment, the friction lock causes the stiffness $S_2$ to be greater than the expected variation due to the material properties and/or the dimensional limits. As such, if the second rate of increase $S_2$ is outside its acceptable range, steps 110 and following are performed, as described above. Disassembling and re-assembling the elements on the shaft, and optionally correcting one or more of the elements, may remove the friction lock such that the second rate of increase $S_2$ is brought within its acceptable range.

The presence of a friction lock may cause a gap between the elements in the preloaded assembly, thus reducing the effectiveness of the compressive preload applied to the elements. Accordingly, in a particular embodiment, the evaluation of the second rate of increase $S_2$ during the first test 105 may allow for the detection and correction of such a gap which may otherwise remain undetected.

Referring back to FIG. 3, after the axial tension is released as step 128, a second test 129 is performed. Although the method 100 shown in FIG. 3 includes both the first test 105 and the second test 129, in an alternate embodiment, only one of the first and second test 105, 129 is performed.

In step 129, the second test includes determining one or more validation parameter(s) from the load and the elongation, and determining if each validation parameter is within a respective predetermined range around a respective nominal value therefor. The parameter(s) are selected such as to be indicative of an aspect of the quality of the preload in the assembly.

If one or more of the validation parameter(s) is out of its respective range, the compression preload is determined to be unacceptable and to require correction. As such, the axial load is re-applied up to different maximum load $L_I$ and the position of the retaining member is adjusted in step 134. The axial load can then be released again and the method is repeated from step 128 described above.

If each validation parameter is within its respective range, the compressive preload is validated.

The second test 129 thus allows for complementary validation of the compressive preload after it has being applied but prior to dynamic testing, thus in a particular embodiment simplifying the process of applying necessary corrections since such corrections may be applied before the preloaded assembly is put in use and/or tested.

In the particular embodiment shown in FIG. 6, an initial stretch IS corresponds to the application of the maximum load $L_I$, right before the retaining member is engaged to the tensioning member. Once the retaining member is engaged to the tensioning member and the axial tension is released, some retraction of the tensioning member occurs, leaving the tensioning member with a residual stretch RS which is smaller than the initial stretch IS, and a corresponding residual load $L_R$. Examples of parameters which may be determined in the second test 129 are shown and include the residual load $L_R$ and/or an effective load $L_{EFF}$, and an effective load energy $E_{EFF}$ (see FIG. 7). Minimum and maximum acceptable values may also be defined for the residual stretch RS ($RS_{MIN}$, $RS_{MAX}$), the initial stretch IS ($IS_{MIN}$, $IS_{MAX}$), and the maximum load $L_I$ ($L_{I\_MIN}$, $L_{I\_MAX}$) and the second test 129 may include evaluations of one or more of these parameters with respect to their respective ranges.

Figure 5:
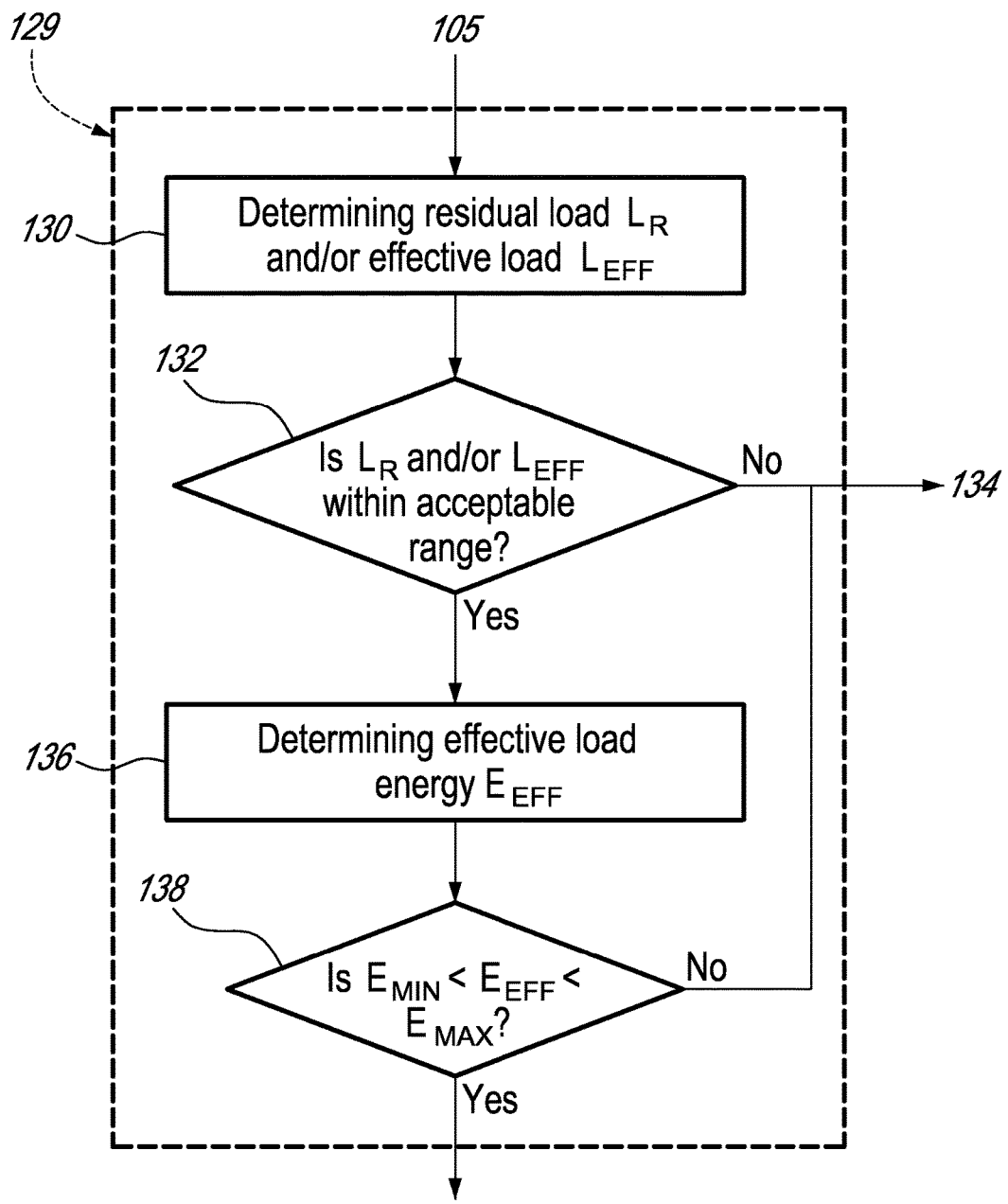
FIG. 5 is a flow chart of a second test of the method of FIG. 3, in accordance with a particular embodiment.

Referring to FIG. 5, an example for the second test 129 is shown. Although in the embodiment shown the residual load $L_R$ and/or the effective load $L_{EFF}$ and the effective load energy $E_{FF}$ are determined and evaluated, it is understood that in another embodiment, only one or two of the parameters may be determined and evaluated. It is also understood that additional or alternate parameters may be determined and evaluated from the load and the elongation if such parameters are indicative of an aspect of the quality of the preload in the assembly which may be corrected if required.

Second test 129 as shown includes step 130, where the residual load $L_R$ and/or the effective load $L_{EFF}$ corresponding to the difference between the residual load $L_R$ and the transition load $L_T$ is determined. The effective load $L_{EFF}$ is representative of the portion of the applied load causing the compressive preload, as opposed to the portion used in the seating part of the loading process.

In step 132, the residual load $L_R$ is compared to a predetermined acceptable range defined between a minimum value $L_{R\_MIN}$ and a maximum value $L_{R\_MAX}$, and/or the effective load $L_{EFF}$ is compared to a predetermined acceptable range defined between a minimum value $L_{E\_MIN}$ and a maximum value $L_{E\_MAX}$, with each range representing an acceptable variation around a respective nominal value determined based on the desired compressive preload to be applied to the elements. As such, if the residual load $L_R$ and/or effective load $L_{EFF}$ is outside its acceptable range, step 134 is performed as described above. Adjusting the intensity of the axial tension applied to the tensioning member may allow the residual load $L_R$ and the effective load $L_{EFF}$ to be brought within their respective acceptable range.

In a particular embodiment, the nominal residual stretch RS is calculated from the initial stretch IS and the maximum load $L_I$ as:

$$RS = IS - \Delta S = IS - \frac{L_I}{K_{M2}}$$

where $K_{M2}$ is the stiffness of an equivalent stiffness member corresponding to the combined elements which formed the interference fit adjacent the end of the tensioning member on which the tension is applied, without the tensioning member. For example, in the embodiment of FIG. 2, the equivalent stiffness member may be defined as the combination of the elements identified by $M_2$: bearing race, seal runners, and aft end 30 of the turbine hub 24, i.e. the member M1 without the portion of the shaft 34. The nominal value for the effective load $L_{EFF}$ is then calculated as:

$$L_{EFF} = K_{shaft} \times (RS - TS)$$

and the nominal value for the residual load $L_R$ is:

$$L_R = L_T + L_{EFF}$$

In a particular embodiment, the minimum values for effective load $L_{EFF}$ and the residual load $L_R$ are defined as ±10% of the respective nominal value. Other variations may alternately be used.

Figure 7:
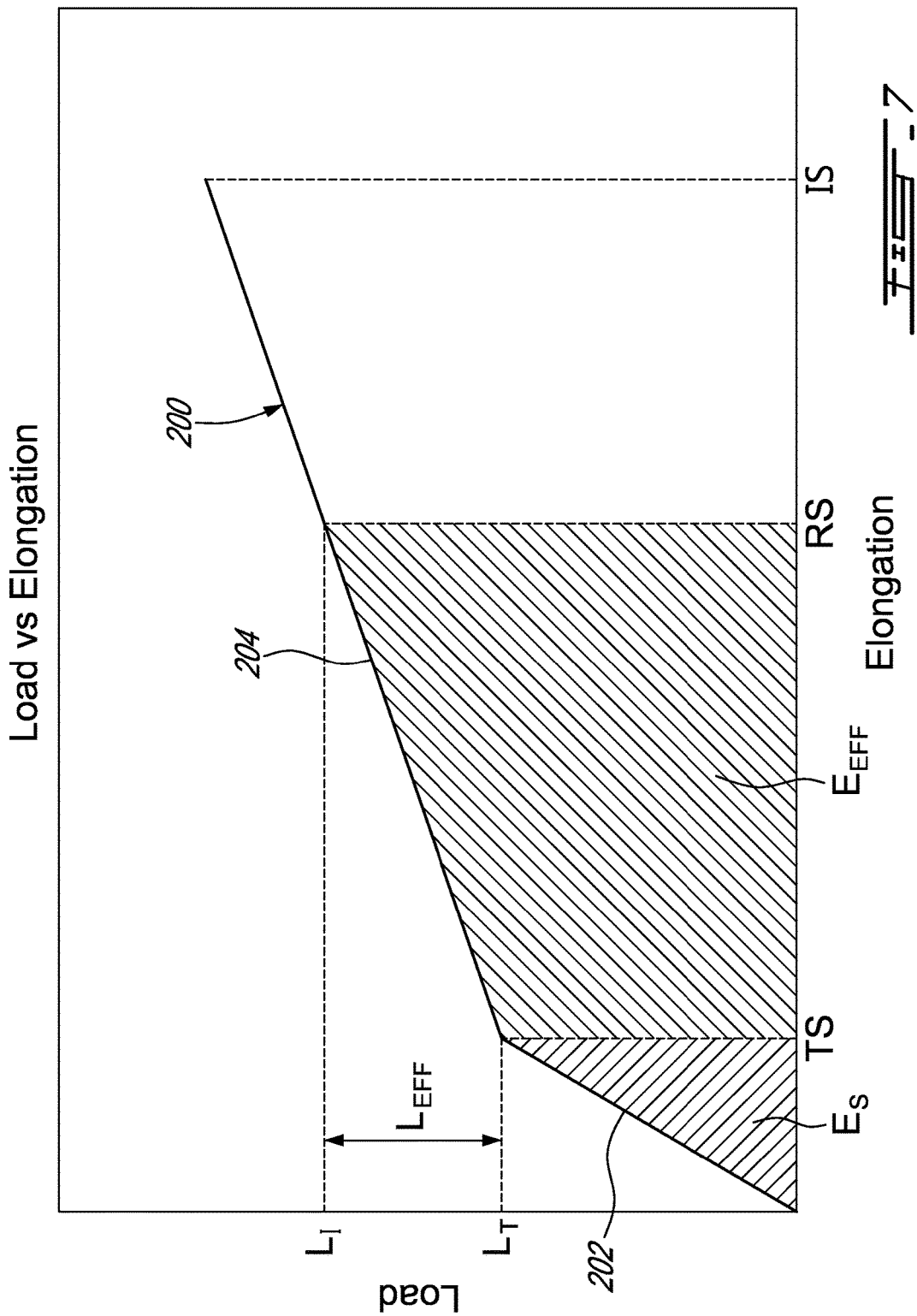
FIG. 7 is a graph of the load as a function of the elongation of a tensioning member of the embodiment of FIG. 6 with different parameters being indicated thereon.

Second test 129 as shown includes step 136, where the effective load energy $E_{EFF}$ is evaluated. The effective load energy $E_{EFF}$ is representative of the portion of the energy used on the compressive preload, as opposed to the portion of energy $E_S$ used in the seating part of the loading process. Referring to FIG. 7, the effective load energy $E_{EFF}$ represents the area under the second linear portion 204 of the relation between the load and elongation, between the transition stretch TS of the transition point and the residual stretch RS. The load energy used during the seating process $E_S$ represents the area under the first linear portion 202.

In step 138, the effective load energy $E_{EFF}$ is compared to a predetermined acceptable range defined between a minimum value $E_{MIN}$ and a maximum value $E_{MAX}$, which represent an acceptable variation around a nominal value. The nominal value may be determined based on the desired compressive preload on the elements and may be calculated based on the previously calculated nominal values. As such, if the effective load energy $E_{EFF}$ is outside its acceptable range, step 134 is performed as described above. Adjusting the intensity of the axial tension applied to the tensioning member may allow the effective load energy $E_{EFF}$ to be brought within its acceptable range.

In a particular embodiment, the determination of the effective load $L_{EFF}$ and/or of the effective load energy $E_{EFF}$ allows to predict more precisely the portion of the applied load which is used in the compression preload. Typically, a theoretical value of the load energy or load is assumed to be used for the seating part of the loading, and the determination of the load to be applied is made based on this assumption. If the assumption is incorrect, inappropriate compression loading is revealed once the preloaded assembly is rotated, for example by unacceptable vibrations. In a particular embodiment, the method thus allows to determine directly the portion of the load energy or load applied to the compression preload, and to correct the applied load if required, before the preloaded assembly is tested. In a particular embodiment, such may allow for the optimization of the effective load and for compensation for the transition load variations between assemblies, allowing for improvement in the stability of the assembly.

Although not shown, the second test 129 may include the determination and evaluation or one or more of the first constant rate of increase $S_1$ of the load with respect to the elongation, the transition load $L_T$, and the second constant rate of increase $S_2$ of the load with respect to the elongation. However, in a particular embodiment, evaluation of these parameters in the first test 105, i.e. before the retaining member is engaged, allows for necessary corrections revealed by these parameters to be done more easily and rapidly.

In a particular embodiment, the method 100 allows for reduction of vibrations in the assembly, by detecting potential problems which may cause such vibrations before the assembly is tested and put to use, allowing the correction of these potential problems before vibrations are experienced.

In a particular embodiment, the method 100 may be performed using a system 200 such as shown in FIG. 8. In the embodiment shown, the system 200 includes a processing unit 204 receiving measurement data from one or more sensors 202, the measurement data being indicative of physical quantities related to the load and the elongation during the application of the axial tension, as described above.

The processing unit 204 is configured, for example through a monitoring module 206, to receive the measurement data, determine the load and the elongation from that measurement data and to send corresponding load and elongation signals.

The processing unit 204 is also configured, for example through a parameter determination module 208, to receive the load and elongation signals, to determine at least one validation parameter from the load and the elongation signals, and to send a corresponding validation parameter signal.

Referring to FIG. 9, in a particular embodiment, the parameter determination module 208 may include a respective module for the determination of each parameter of interest; for example, a first constant rate of increase $S_1$ determination module 220, a transition load $L_T$ determination module 222, a second constant rate of increase $S_2$ determination module 224, a residual load $L_R$ and/or effective load $L_{EFF}$ determination module 226, and an effective load energy $E_{EFF}$ determination module 228. The modules may communicate with one another to exchange relevant information for the determination of their respective parameter. Alternately, some or all parameters may be determined by a same module.

Referring back to FIG. 8, the processing unit 204 is further configured, for example through a comparator 210, to receive the validation parameter signal, compare each validation parameter with its respective predetermined range, and to send a comparison signal validating the compressive axial preload when each validation parameter is within the respective predetermined range and rejecting the compressive axial preload when at least one validation parameter is out of its respective range.

It is understood that the processing unit 204 may include more or less modules than the embodiment shown. For example, a same module may be configured to perform more than one function.

The system 200 further comprises an output unit 214 which is configured to receive the validation signal and to output data based on the validation signal. For example, the output unit may be a display unit visually displaying the results of the parameter evaluation(s) for review by an operator.

Accordingly, in a particular embodiment, the system 200 determines and evaluates the parameters and outputs indications to an operator who in turn actuates the application and release of the axial tension, engages the retaining member, and disassembles, corrects and assembles the members as required and following the indications on the output unit 214.

In the embodiment of FIG. 8, the system 200 further includes a machine control unit 212 also receiving the comparison signal, and outputting an actuation signal based on the validation signal. The actuation signal may be designed to actuate a machine tool applying the axial tension, a machine tool adapted to remove and engage the retaining member, and/or a machine tool adapted to manipulate the elements to assemble and disassemble them from the shaft. Accordingly, in a particular embodiment, all steps of the method 100 as described above may be performed by a system such as shown at 200.

In an alternate embodiment, the load and elongation are output by sensors which are read by an operator, and the operator determines and evaluates the selected parameters based on the load and elongation values observed, and corrects the assembly as required based on the evaluation of the selected parameters.

The above description is meant to be exemplary only, and one skilled in the art will recognize that changes may be made to the embodiments described without departing from the scope of the invention disclosed. Other modifications than those described which fall within the scope of the present invention will be apparent to those skilled in the art, in light of a review of this disclosure, and such modifications are intended to fall within the appended claims.

The invention claimed is:

1. A method of validating a compressive axial preload on adjacent rotatable elements serially arranged around a shaft, the axial preload being created through application of a progressively increasing axial tension to a tensioning member configured to compress the elements when the axial tension is applied thereto, the tensioning member corresponding to the shaft around which the elements are arranged or to another elongated member, the method comprising:

a) monitoring a load in the tensioning member and/or in one or more of the elements during application of the axial tension;

b) monitoring an elongation of the tensioning member during application of the axial tension;

c) determining at least one validation parameter from the load and the elongation;

d) comparing each validation parameter with a respective predetermined range; and e) if at least one of the at least one validation parameter is out of the respective predetermined range, correcting the preload on the elements, and repeating the method from step a).

2. The method as defined in claim 1, wherein the preload is maintained through engagement of a retaining member with the tensioning member to prevent retraction of the tensioning member once the axial tension thereon is released, and wherein:

steps c) and d) are performed before the retaining member is engaged with the tensioning member;

if each validation parameter is within the respective predetermined range, the axial tension is applied up to a predetermined value, the retaining member is engaged with the tensioning member, and the axial tension is released; and if at least one of the at least one validation parameter is out of the respective predetermined range, step e) includes releasing the axial tension on the tensioning member before the retaining member is applied, at least partially disassembling elements from around the shaft, re-assembling the elements around the shaft, and re-applying the axial tension on the tensioning member.

3. The method as defined in claim 2, wherein the load increases linearly as a function of the elongation following a first rate of increase up to a point of transition and following a second rate of increase after the point of transition, and steps c) and d) include:

determining the first rate of increase of the load with respect to the elongation; and comparing the first rate of increase with the respective predetermined range; and/or determining a transition load at the point of transition and comparing the transition load with the respective predetermined range; and/or determining the second rate of increase of the load with respect to the elongation and comparing the second rate of increase with the respective predetermined range.

4. The method as defined in claim 3, wherein step c) includes determining the first rate of increase of the load with respect to the elongation, and wherein the respective range for the first rate of increase is determined around a respective nominal value determined based on a stiffness of the elements and of the tensioning member.

5. The method as defined in claim 3, wherein step c) includes determining the transition load, and wherein the respective range for the nominal value for the transition load is determined around a respective nominal value determined based on a required interference fit between the elements and the shaft.

6. The method as defined in claim 3, wherein step c) includes determining the second rate of increase of the load with respect to the elongation, and wherein the respective range for the second rate of increase is determined around a respective nominal value determined based on a stiffness of the tensioning member without the elements.

7. The method as defined in claim 3, wherein step c) includes determining the first rate of increase of the load, the transition load and the second rate of increase of the load.

8. The method as defined in claim 1, wherein the preload is maintained in the assembly through engagement of a retaining member with the tensioning member preventing retraction of the tensioning member once the axial tension thereon is released, and wherein:

steps c) and d) are performed after the retaining member is engaged with the tensioning member and the axial tension is released;

if at least one of the at least one validation parameter is out of the respective predetermined range, step e) includes re-applying the axial tension on the tensioning member, adjusting a position of the retaining member on the tensioning member, and releasing the axial tension.

9. The method as defined in claim 8, wherein the load increases linearly as a function of the elongation following a first rate of increase up to a point of transition and following a second rate of increase after the point of transition, and steps c) and d) include:

determining residual load at a point after the axial tension is released and comparing the residual load with the respective predetermined range; and/or determining an effective load corresponding to a difference between the residual load and the load at the point of transition and comparing the effective load with the respective predetermined range; and/or determining an effective load energy between the point after the axial tension is released and the point of transition and comparing the effective load energy with the respective predetermined range.

10. A method of applying a compressive axial preload on adjacent rotatable elements serially arranged around a shaft, the method comprising:

a) inducing the compressive axial preload by applying axial tension to a tensioning member connected to an abutment surface pressing against the elements when the tensioning member is under the axial tension, the tensioning member corresponding to the shaft around which the elements are arranged or to another elongated member, the axial tension being applied in a progressively increasing manner;

b) monitoring a load in the tensioning member and/or in one or more of the elements and an elongation of the tensioning member as the axial tension is applied;

c) determining at least one validation parameter from the load and the elongation;

d) comparing each validation parameter with a respective predetermined range therefor;

e) if each validation parameter is within the respective predetermined range, applying the axial tension up to a predetermined value, engaging a retaining member with the tensioning member to block retraction of the tensioning member and maintain the compressive axial preload on the elements, and releasing the axial tension; and f) if at least one of the at least one validation parameter is out of the respective predetermined range, releasing the axial tension on the tensioning member before the retaining member is engaged, at least partially disassembling elements from around the shaft, re-assembling the elements around the shaft, and repeating the method from step a).

11. The method as defined in claim 10, wherein the load increases linearly as a function of the elongation following a first rate of increase up to a point of transition and following a second rate of increase after the point of transition, and steps c) and d) include:

determining the first rate of increase of the load with respect to the elongation; and comparing the first rate of increase with the respective predetermined range; and/or determining a transition load at the point of transition and comparing the transition load with the respective predetermined range; and/or determining the second rate of increase of the load with respect to the elongation and comparing the second rate of increase with the respective predetermined range.

12. The method as defined in claim 11, wherein step c) includes determining the first rate of increase of the load with respect to the elongation, and wherein the respective range for the first rate of increase is determined around a respective nominal value determined based on a stiffness of the elements and of the tensioning member.

13. The method as defined in claim 11, wherein step c) includes determining the transition load, and wherein the respective range for the transition load is determined around a respective nominal value determined based on a required interference fit between the elements and the shaft.

14. The method as defined in claim 11, wherein step c) includes determining the second rate of increase of the load with respect to the elongation, and wherein the respective range for the second rate of increase is determined around a respective nominal value determined based on a stiffness of the tensioning member without the elements.

15. The method as defined in claim 10, further comprising after engaging the retaining member with the tensioning member and releasing the axial tension:

determining at least one additional validation parameter from the load and the elongation;

comparing each additional validation parameter with a respective predetermined range; and if at least one of the at least one additional validation parameter is out of the respective predetermined range, re-applying the axial tension on the tensioning member up to a different value, adjusting a position of the retaining member on the tensioning member, and releasing the axial tension.

16. The method as defined in claim 15, wherein the load increases linearly as a function of the elongation following a first rate of increase up to a point of transition and following a second rate of increase after the point of transition, and determining the at least one additional validation parameter includes:

determining a residual load at a point after the axial tension is released and comparing the residual load with the respective predetermined range; and/or determining an effective load corresponding to a difference between the residual load and the load at the point of transition and comparing the effective load with the respective predetermined range; and/or determining an effective load energy between the point after the axial tension is released and the point of transition and comparing the effective load energy with the respective predetermined range.

17. A system for validating a compressive axial preload on adjacent rotatable elements serially arranged around a shaft, the axial preload being created through application of a progressively increasing axial tension to a tensioning member configured to compress the elements when the axial tension is applied thereto, the system comprising:

a processing unit configured to:

receive measurement data from one or more sensors indicative of a physical quantity related to a load in the tensioning member and/or in one or more of the elements during application of the axial tension and indicative of a physical quantity related to an elongation of the tensioning member during application of the axial tension, determine the load and the elongation from the measurement data, determine at least one validation parameter from the load and the elongation, compare each validation parameter with a respective predetermined range therefor, and send a comparison signal validating the compressive axial preload when each validation parameter is within the respective predetermined range and rejecting the compressive axial preload when at least one of the at least one validation parameter is out of the respective range;

an output unit configured to receive the comparison signal and to output data based on the comparison signal; and a machine control unit configured to receive the comparison signal, the machine control unit accordingly actuating a machine tool responsive to validating or rejecting the compressive axial preload.

18. The system as defined in claim 17, wherein the machine control unit actuates the machine tool to apply the axial tension and/or cause a required displacement of the elements.

19. The system as defined in claim 17, wherein the load increases linearly as a function of the elongation following a first rate of increase up to a point of transition and following a second rate of increase after the point of transition, and wherein the preload is maintained through engagement of a retaining member with the tensioning member to prevent retraction of the tensioning member once the axial tension thereon is released, and wherein the processing unit includes:

a first rate module configured to determine the first rate of increase of the load with respect to the elongation; and/or a transition module configured to determine a transition load at the point of transition; and/or a second rate module configured to determine the second rate of increase of the load with respect to the elongation; and/or a load module configured to determine one or both of a residual load at a point after the retaining member is engaged and the axial tension is released and an effective load corresponding to a difference between the residual load and the load at the point of transition; and/or an effective load energy module configured to determine an effective load energy between the point after the retaining member is engaged and the axial tension is released and the point of transition.

* * * * *